United States Patent [19]

Tucholski et al.

[11] 4,025,696

[45] May 24, 1977

[54] SAFETY SWITCH FOR SMALL DIAMETER GALVANIC CELLS

[75] Inventors: Gary Ronald Tucholski; Frank George Spanur, both of Parma Heights, Ohio

[73] Assignee: Union Carbide Corporation, New York, N.Y.

[22] Filed: May 24, 1976

[21] Appl. No.: 689,525

[52] U.S. Cl. .................................. 426/61; 429/58; 429/66
[51] Int. Cl.² .......................................... H01M 2/00
[58] Field of Search ........................ 429/58, 61, 66

[56] References Cited

UNITED STATES PATENTS

| | | | |
|---|---|---|---|
| 2,651,669 | 9/1953 | Neumann | 429/58 |
| 3,081,366 | 3/1963 | Belove | 429/58 |
| 3,373,057 | 3/1968 | Jost et al. | 429/58 |
| 3,622,397 | 11/1971 | Belove | 429/58 |
| 3,676,221 | 7/1972 | Bach | 429/61 |

*Primary Examiner*—Donald L. Walton
*Attorney, Agent, or Firm*—Eugene Lieberstein

[57] ABSTRACT

The Galvanic Cell assembly incorporates an integral safety pressure switch comprising an active member and an insulating member. The active member is an electrically conductive invertible spring member having an inclined deformable first section, a curved second section and a centrally disposed opening. The cell container may be dished inwardly to provide additional room for the switch and to provide added deflection under pressure for operating the switch.

10 Claims, 6 Drawing Figures

SAFETY SWITCH FOR SMALL DIAMETER GALVANIC CELLS

This invention relates to sealed galvanic cells or batteries and more particularly to a sealed galvanic cell construction in which the electrical continuity of the cell is broken in response to a predetermined physical deformation of the cell.

Tightly sealed alkaline cells can pose a safety hazard under misuse or abuse conditions simply through overcharge or overdischarge where internal gas pressure rises uncontrollably. Unless suitably protected the internal pressure can rise to hundreds of pounds per square inch and may result in seal rupture. Normal safe-guards include pressure vents which may operate in combination with a gas permeable seal diaphragm designed to relieve some of the excess gas through diffusion. Further precautionary measures include provision for destruction of the seal diaphragm by penetration or rupture. Although such steps are necessary from a safety standpoint, once the seal is broken the cell is subject to loss of corrosive electrolyte which itself is potentially harmful, unsightly and damaging to its immediate surrounding environment.

An alternative or augmentative approach is to provide a separate control element which senses battery temperature and/or pressure and cuts off current flow through the cell. The prior art is replete which auxiliary controls of such type for temporarily interrupting current flow at one of the cell terminals in response to a build up of gas pressure for example. These controls take up space, are expensive and suffer from a lack of positive action and a susceptibility to instability and chattering of the electrical contact. Moreover, repeated on-off cycling will eventually bring the cell to a ruinous state accompanied by a rupturing of the diaphragm and loss of electrolye to outside the cell.

In a companion patent application U.S. Ser. No. 689,524 entitled Safety Switch for Sealed Galvanic Cells, filed of even date herewith in the name of G. Tucholski, a sealed galvanic cell assembly is shown and described including in combination a compact switch means for irreversibly cutting off current flow through the cell upon a predetermined expansion of the metallic cell container. The swtich mens comprises an active spring member having an inclined deformable section and an insulating member located between the metallic cover plate and the metallic cell container. For smaller diameter galvanic cells or batteries particularly those having a diameter of about one-half inch or less such as in the type "AA" battery the sensitivity of the switch means must be greater due to the smaller expansion of the cell container. Moreover, the range of adjustment of the dimensions of the switch means to increase sensitivity and compensate for reduced expansion of the smaller size cells is limited if buckling of the inclined deformable section and erratic operation are to be avoided.

In accordance with the present invention the sensitivity and reliability of the foregoing described switch means is increaded to make it more suitable for use in smaller cells. The improved switch means comprises an active switch member having an inclined deformable first section, a curved second section of predetermined radius and a centrally disposed opening. The second section is preferably located adjacent the central opening in the active member.

Other advantages of the present invention will become apparent from the following detailed description of the invention when read in connection with the accompanying drawings of which:

Figure 1:
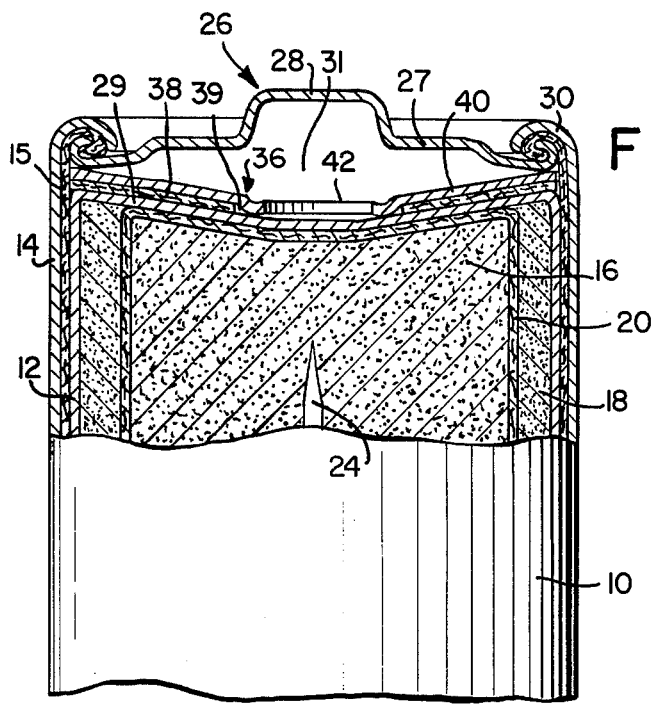
FIG. 1 is an elevational view partially in section of an alkaline manganese dioxide zinc cell embodying the switch means of the present invention.
Figure 3:
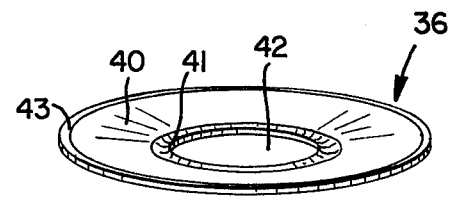
FIG. 3 is a diagrammatic view of the active member of the preferred switch means of the present invention.
Figure 2:
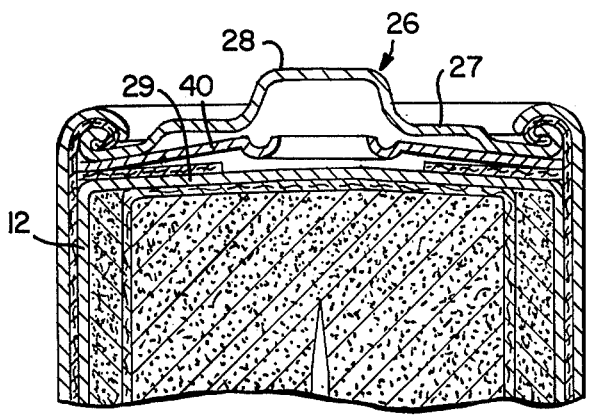
FIG. 2 is an enlarged fragmentary view of a section of the cell of FIG. 1 showing the switch means in its open configuration after the cell has ben abuse charged.

Referring now to the drawings and particularly to FIGS. 1–3 inclusive in which a typical alkaline glavanic cell 10 of the present invention is shown comprising an inverted metallic cupped container 12 provided with an outer metal jacket 14 separated by an insulating liner 15 of preferably paper or other fibrous material. Disposed within the container 12 is a tubular anode 16, a tubular cathode 18, a separator 20 and an alkaline electrolyte which permeates the anode 16, cathode 18, and separator 20 respectively. An anode current pin type collector 24 extends lengthwise within the cell 10, parallel to the longitudinal axis of the cell, from a location in contact with the anode 16 to the negative end 25 of the cell 10 where it terminates.

A metallic cover plate 26 having a projected shoulder portin 27 and a raised protuberance 28 is mounted over the bottom end 29 of the container 12 with the raised protuberance 28 centered substantial alignment with the longitudinal axis of the cell 10. The raised protuberance represents the positive terminal of cell 10. The shoulder portion 27 and the raised protuberance 28 leave a void or cavity 31 between the cover plate 26 and the bottom end 29 of the container 12 in which the switch means of the present invention is located. The switch means of the present invention comprises an active member 36 and a passive member 38. The outer metal jacket 14 is crimped over the cover plate 26 at the positive end of the cell 10 to form a circumferential edge 30 which compresses the coverplate 26 and the switch members 36 and 38 against the metal container 12.

The active switch member 36 of the present invention is an electrically conductive resilient spring-like member having as more clearly illustrated in FIG. 3, an inclined deformable first section 40, a curved second section 41, a flat third section 43 and a centrally located opening 42 of any desired shape although a circular geometry is preferred. The passive member 38 is an insulator of preferably a plastic material, although a fibrous insulator would be acceptable, having a central aperture 39 which is larger in size than the opening 42 of switch member 36. The active switch member 36 is positioned in cell 10 with the flat third section 43 slidably contacting the cover plate 26 and with its opening 42 in substantial alignment with the raised protuberance 28 of the cover plate 26. The passive member 38 lies between the active switch member 36 and the bottom end 29 of the metal container 12 with its central aperature 39 arranged concentric to the opening 42 of switch member 36. Since the aperture 39 of the insulator 38 is larger than the opening 42 of the active member 36 a predetermined portion of the active member 36 will abut the metallic cupped container 12 to insure electrical continuity between the metal container 12 and the cover plate 26 during the normal operation of the cell 10. The bottom end 29 of the inverted metal container 12 is preferably dished inwardly to provide additional room for the active switch member 36 and to increase the bulge or deflection of the bottom end 29 of the container 12 under pressure. The inwardly dished depression in the surface of the bottom end 29 of the container 12 may be formed during the fabrication of the container 12.

The active switch member 36 should possess a deflection characteristic which will result in the inclined deformable section 40 being irreversibly displaced from a first stable position to a second stable position upon the application of a predetermined force resulting from a bulge in the bottom end 29 of the container 12 as will be explained in greater detail hereafter. The second stable position should preferably represent a substantial geometrical inversion of the first position. It is essential that the deflection be related to the applied force in a manner such that only after reaching the predetermined applied force will the deformable section 40 irreversibly move from the first stable position to the second stable position and preferably with almost no further applied force. The inversion of section 40 to a substantially inside out geometry as shown in FIG. 2 will occur when the active switch member 36 is held to within prescribed dimensional limits as will be more specifically defined hereafter.

Although the active switch member 36 can be of any configuration having an inclined deformalbe section 40, which need not be linear, a frustum geometry as is diagrammatically illustrated in FIG. 3 is preferred. A spring washer of the conventional Belleville category is typical of such frustum geometry. To exhibit the desired deflection characteristic the metal stock thickness of the switch member 36 should be generally of on more than 0.010 inches.

The deflection sensitivity response to applied force is believed to be increased and made more reproducible by the incorporation of the curved "U" shaped second sectin 41 particularly in combination with the dished bottom end 29 of container 12. The curved second section 41 is intended to stiffen the active member 36 to provide positive switching action without buckling whereas the dished bottom end 29 provides aded movement. The flat third section 43 serves primarily as an extended lip for readily mounting the spring member 36 in the cell 10 and is not an essential feature of the present invention. Moreover, both the curved second section 41 and the dished container bottom 29 are required only when space is at a premium and/or when sensitivity of the spring member 36 must be enhanced.

Figure 4B:
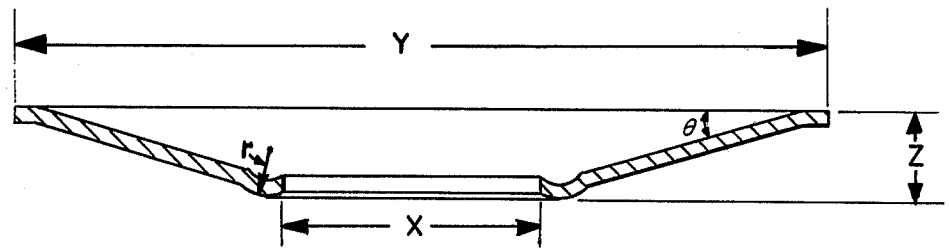
FIG. 4b is a cross-section of the preferred active member of the switch means of FIG. 3.
Figure 4A:
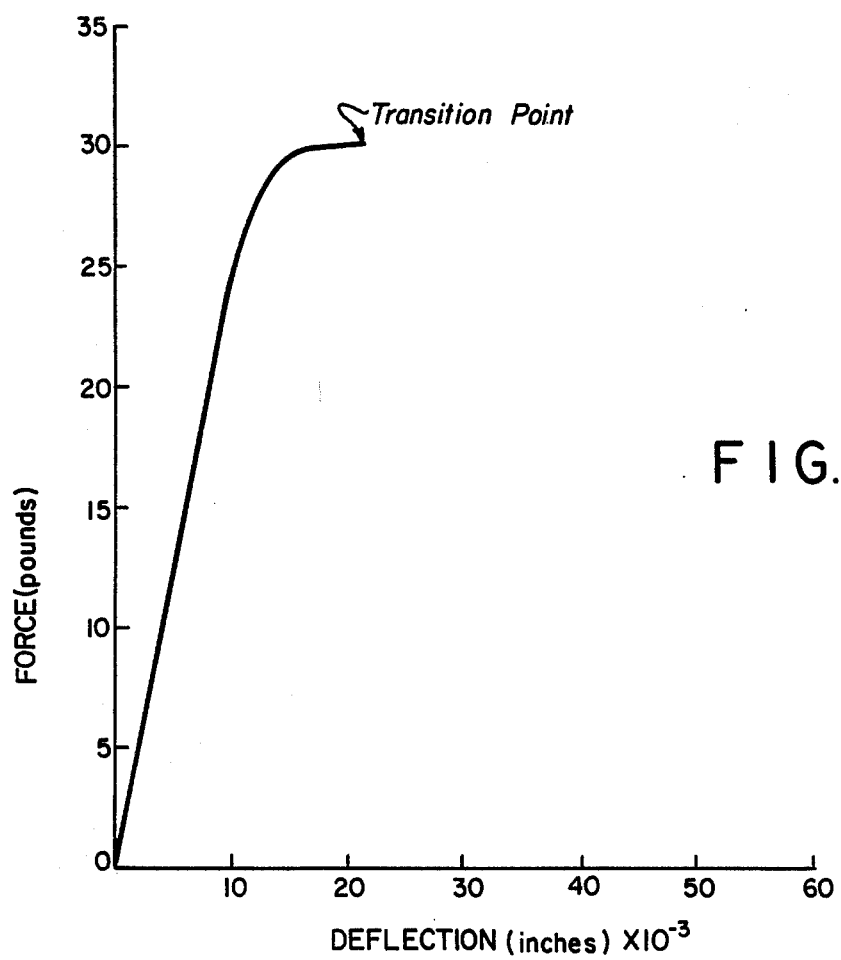
FIG. 4a is a graph of typical force-deflection characteristics for the active member of the switch means of the present invention.

FIG. 4 (a) illustrates a deflection characteristic curve in accordance with the present invention for the active switch member 36 as used in a AA size alkaline $M_n O_2$ battery cell for cell 10. The point of transition from a stable first position to an inverted stable second position occurs at about a thirty pound applied force for a spring member 36 of commercially cold rolled low carbon steel having a Rockwell B70 to B90 hardness or between No. 1 and No. 2 temper and having a thickness of about 0.008 inches with an included angle $\theta$ of preferably 15°. The included angle $\theta$ should not exceed above about 20°. The dimensions $x$, $y$ and $z$ of the spring member 36 as hown in FIG. 4 (b) may vary widely in relation to one another with the size of the battery cell to be controlled. The radius $r$ for the curved section 41 is about 0.020 inch but can vary substantially with changes in the dimensions $x$, $y$ and $z$.

Figure 5:
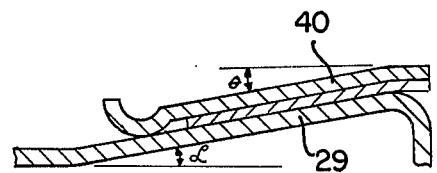
FIG. 5 is an enlarged fragmented section of part of the cell of FIG. 1 showing the angular relationship between the switch means and the dished bottom of the container.

The bottom end 29 of the metal cupped container 12 responds to a build up in internal cell pressure by bulging outwardly. Such physical deformation is typical of all sealed alkaline cells although the point of yield and the container bulge displacement will differ with variation in container size, compositon and thickness. By dishing the bottom end 29 not only is more room and greater deflection realized as indicated hereinbefore but additional movement of the active switch member 36 is achieved. This additional movement may be essential for small size batteries to provide for an adequate clearance after deflection between the switch member and the bottom end 29 of the container 12 in order to irreversibly break electrical contact. In the latter regard it is important that the dished angle $\delta$ as indicated in FIG. 5 be less than the included angel $\theta$.

What is claimed is:

1. A sealed galvanic cell assembly comprising in combination:
   a cylindrical metal container including a positive and negative electrode and an electrolyte, with said container being in electrical contact with said positive electrode;
   an outer cover mounted over said metal container and being of a predetermined configuration to form a substantially centrally located cavity between said cover and said container;
   switch means disposed in said cavity for providing an electrical connection between said container and said outer cover during normal operation of the cell and being responsive to a predetermined expansion of said container for irreversibly breaking such electrical contact;
   said switch means comprising an electrically conducitive active member having an inclined deformable first section, a curved second section, and a substantially centrally disposed opening with said switch means being held in a slidable relationship relative to said container and outer cover respectively.

2. A sealed galvanic cell assembly as defined in claim 1 wherein said inclined deformable first section of said switch means is caused to switch from a first stable position to a substantially inverted second stable position in response to said predetermined expansion of said container.

3. A sealed galvanic cell assembly as defined in claim 2 wherein said switch means further comprises a passive member of insulating material disposed between said active member and said container and having a central aperture of a size substantially larger that the central opening of said active member.

4. A sealed galvanic cell assembly as defined in claim 3 wherein said curved second section lies adjacent to and surrounds the opening of said active member.

5. A sealed galvanic cell assembly as defined in claim 4 wherein said central aperture of said insulating member and the opening of said active member are both circular and concentric to one another.

6. A sealed galvanic cell assembly as defined in claim 5 wherein the bottom surface of said container adjacent said switch means has a depressed surface in a dished configuration.

7. A sealed galvanic cell assembly as defined in claim 6 wherein the included angle of said depressed surface with respect to the horizontal is less than the included angle of said inclined first section with respect to the horizontal.

8. A sealed galvanic cell assembly as defined in claim 7 whrein said active member is of a resilient metal having a Rockwell hardness between B70 to B90.

9. A sealed galvanic cell assembly as defined in claim 8 wherein said inclined first section has an included angle of no greater than about 20° with respect to the horizontal.

10. A sealed galvanic cell assembly as defined in claim 9 wherein said active member includes a third section representing a flat rim extending from said inclined first section.

* * * * *